(12) United States Patent
Suzuki

(10) Patent No.: US 12,475,338 B2
(45) Date of Patent: Nov. 18, 2025

(54) WIRELESS TAG READING APPARATUS, METHOD, AND STORAGE MEDIUM

(71) Applicant: Toshiba Tec Kabushiki Kaisha, Tokyo (JP)

(72) Inventor: Shigeaki Suzuki, Gotemba Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/741,704

(22) Filed: Jun. 12, 2024

(65) Prior Publication Data
US 2025/0077810 A1  Mar. 6, 2025

(30) Foreign Application Priority Data
Sep. 5, 2023 (JP) ................................. 2023-143786

(51) Int. Cl.
*G06K 7/10* (2006.01)
(52) U.S. Cl.
CPC ................ *G06K 7/10366* (2013.01)

(58) Field of Classification Search
CPC .................................................. G06K 7/10366
See application file for complete search history.

(56) References Cited

U.S. PATENT DOCUMENTS

| 6,762,674 B2 * | 7/2004 | Matsushita | G06Q 30/06 340/5.91 |
| 2022/0292321 A1 | 9/2022 | Shigeta | |

* cited by examiner

*Primary Examiner* — Jamara A Franklin
(74) *Attorney, Agent, or Firm* — Kim & Stewart LLP

(57) ABSTRACT

A wireless tag reading apparatus includes a reading device; and a processor configured to: control the reading device to attempt to read tag data from a wireless tag based on a response wave transmitted from the wireless tag, determine whether the tag data has been read normally, upon determining that the tag data has been read normally, output either the tag data or first information based on the tag data, and upon determining that the tag data has not been read normally, output second information indicating presence of the wireless tag.

18 Claims, 5 Drawing Sheets

WIRELESS TAG READING APPARATUS, METHOD, AND STORAGE MEDIUM

CROSS-REFERENCE TO RELATED APPLICATION(S)

This application is based upon and claims the benefit of priority from Japanese Patent Application No. 2023-143786, filed Sep. 5, 2023, the entire contents of which are incorporated herein by reference.

FIELD

Embodiments described herein relate generally to a wireless tag reading apparatus, a method, and a storage medium.

BACKGROUND

Conventionally, an item to which a wireless tag, such as a Radio Frequency IDentification (RFID) tag, is attached is managed by reading data (hereinafter also referred to as tag data) stored in the wireless tag with a wireless tag reading apparatus. Also, for example, by specifying an identification code included in tag data, it is possible to determine whether a wireless tag (or an item) with the specified identification code is present, or find the location of the wireless tag, based on the communication status with the wireless tag.

Here, a wireless tag reading apparatus reads tag data by decoding a response wave from a wireless tag. However, there are cases in which the wireless tag reading apparatus cannot normally read the tag data due to various factors.

For example, because the response wave from the wireless tag becomes weaker as the distance between the wireless tag reading apparatus and the wireless tag increases, there is a case in which the wireless tag reading apparatus cannot normally read the tag data even when the response wave from the wireless tag can be received. Also, for example, in a logistics warehouse where a large number of items (or wireless tags) are stored, since metal shelves provided in the logistics warehouse interfere with radio waves, it may occur that tag data can be read at a certain position but cannot be normally read at a slightly different position even when a response wave can be received.

As described above, with a wireless tag reading apparatus, there is a case in which tag data cannot be read normally even when a response wave from a wireless tag can be received. When this occurs, for example, while the presence or the location of the wireless tag is being determined, the result of determining the presence or the location of the wireless tag may be lost. Therefore, there is a need for improvement in terms of convenience.

SUMMARY OF THE INVENTION

An aspect of this disclosure provides a wireless tag reading apparatus, a method, and a storage medium that improves convenience in reading a wireless tag.

According to an aspect of this disclosure, a wireless tag reading apparatus includes a reading device; and a processor configured to: control the reading device to attempt to read tag data from a wireless tag based on a response wave transmitted from the wireless tag, determine whether the tag data has been read normally, upon determining that the tag data has been read normally, output either the tag data or first information based on the tag data, and upon determining that the tag data has not been read normally, output second information indicating presence of the wireless tag.

DETAILED DESCRIPTION

Hereinafter, a wireless tag reading apparatus, a method, and a storage medium according to an embodiment will be described with reference to the drawings. In the present embodiment, the wireless tag reading apparatus reads an RFID tag, which is an example of a wireless tag. Also, in the present embodiment, it is assumed that the wireless tag reading apparatus and the wireless tag communicate with each other using the Class 1 Generation 2 (C1G2) protocol that is a standard RFID protocol in the UHF band (950 MHz band) and proposed by the Electronic Product Code (EPC) global, which is an RFID standardization group.

Figure 1:
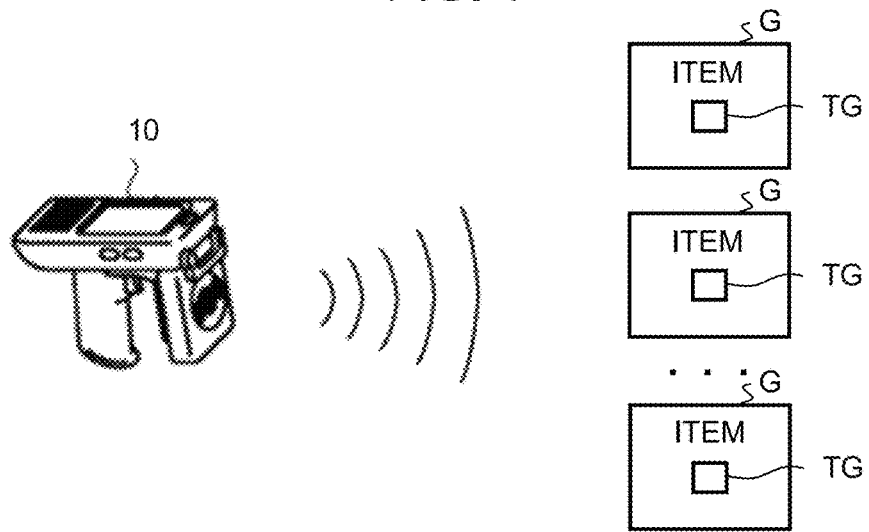
FIG. 1 is a diagram illustrating a configuration of a wireless tag reading apparatus according to an embodiment.

First, a wireless tag reading apparatus 10 according to the present embodiment will be described with reference to FIG. 1. FIG. 1 is a diagram illustrating an example of a configuration of the wireless tag reading apparatus 10. The wireless tag reading apparatus 10 is capable of reading tag data stored in a wireless tag TG in a contactless manner.

The wireless tag TG is attached to an item G, such as a commodity, and stores tag data in a storage medium (not shown). The tag data includes an EPC code, a Cyclic Redundancy Code (CRC) 16, and the like. The EPC code includes an item code (for example, a SKU code or a JAN code) for identifying the type of the item G and a unique serial code for identifying the wireless tag TG. The CRC 16 is an example of error detection data for detecting an error or corruption in the tag data caused by data transfer.

The wireless tag reading apparatus 10 is, for example, a handheld wireless tag reading apparatus and can be carried by an operator. For example, the wireless tag reading apparatus 10 is positioned by the operator to face, for example, a shelf on which the item G is placed to read the tag data from the wireless tag TG attached to the item G.

Figure 2:
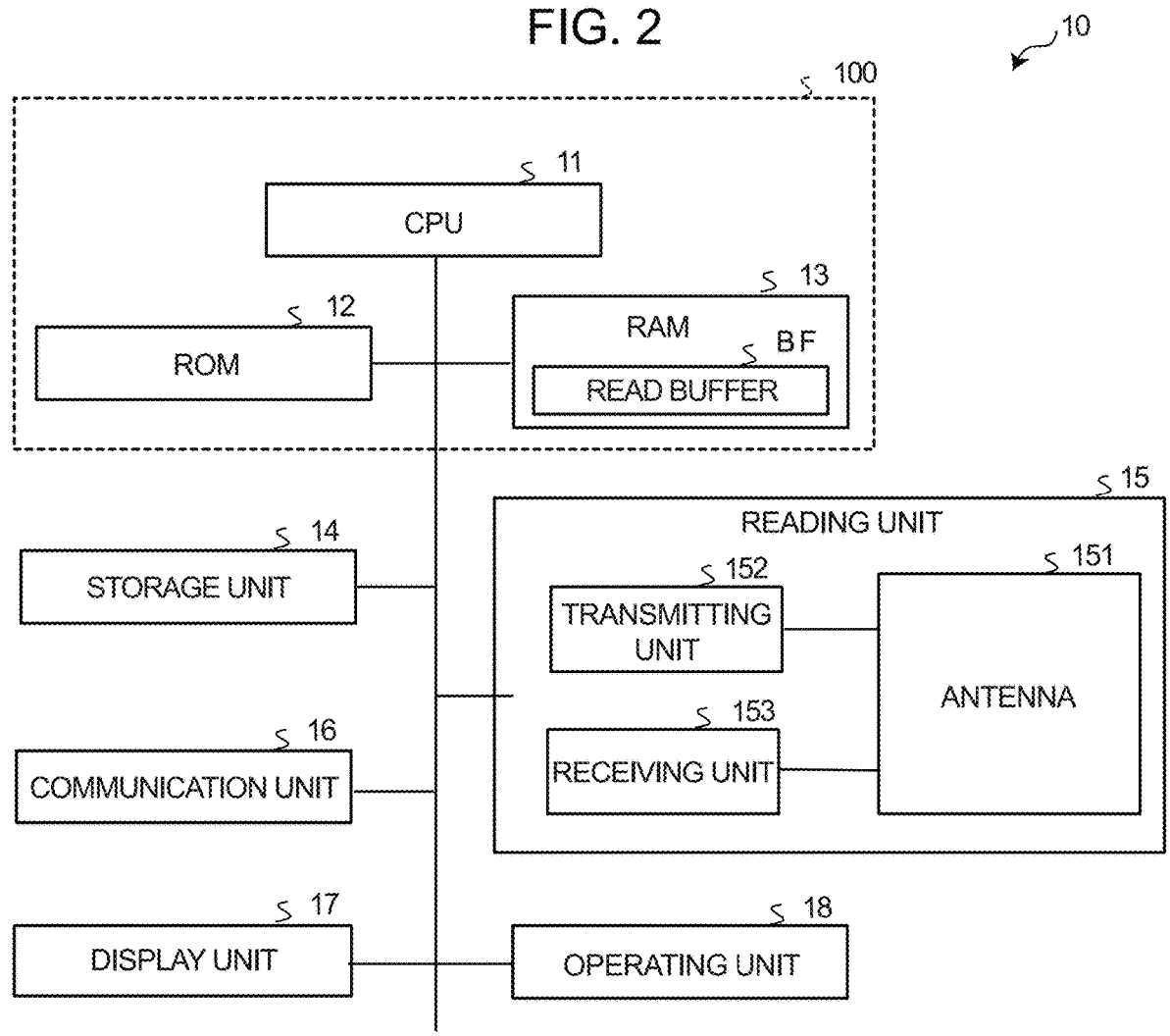
FIG. 2 is a diagram illustrating a hardware configuration of the wireless tag reading apparatus according to the embodiment.

Next, a hardware configuration of the wireless tag reading apparatus 10 will be described. FIG. 2 is a diagram illustrating an example of a hardware configuration of the wireless tag reading apparatus 10.

As illustrated in FIG. 2, the wireless tag reading apparatus 10 includes a Central Processing Unit (CPU) 11, a Read-Only Memory (ROM) 12, a Random Access Memory (RAM) 13, a storage unit 14, a reading unit 15, a communication unit 16, a display unit 17, and an operating unit 18. The CPU 11 is an example of a processor and totally controls the operation of the wireless tag reading apparatus 10. The ROM 12 stores various programs. The RAM 13 is used as a working memory into which various types of data are loaded. The RAM 13 also includes a read buffer BF for storing tag data read from the wireless tag TG.

The CPU 11, the ROM 12, the RAM 13, the storage unit 14, the reading unit 15, the communication unit 16, the display unit 17, and the operating unit 18 are connected to each other via a bus or the like. Here, the CPU 11, the ROM 12, and the RAM 13 constitute a control unit 100. The CPU 11 of the control unit 100 operates according to a program stored in the ROM 12 or the storage unit 14 and thereby performs a control process described later.

The storage unit 14 is an example of a storage device and is implemented by a non-volatile memory, such as a flash memory, that retains stored information even when the power is turned off. The storage unit 14 stores various programs and setting information.

Also, the storage unit 14 may store a data table (hereinafter, also referred to as an item management table) that contain item codes of items being managed, item names and management numbers of the items corresponding to the item codes, and the inventory quantities of the items corresponding to the item codes in association with each other. Here, each inventory quantity indicates a theoretical inventory quantity that is supposed to be stored in, for example, a warehouse. The item management table is used, for example, when outputting an item name or a management number corresponding to an item code included in tag data read from the wireless tag TG or when outputting the number of read items for each item name or management number.

Furthermore, the storage unit 14 may store a data table (hereinafter, also referred to as an individual item management table) that contain an item name or a management number of an item being managed and tag data including an EPC code assigned to the item in association with each other. For example, multiple EPC codes corresponding to the inventory quantity of an item are stored in association with the item name or the management number of the item. The individual item management table is used, for example, when outputting information indicating whether an item corresponding to an EPC code included in tag data read from a wireless tag TG is present.

The reading unit 15 and the communication unit 16 are connected to the control unit 100 via a bus or the like. The reading unit 15 is an example of a reading device and includes an antenna 151, a transmitting unit 152, and a receiving unit 153. The transmitting unit 152 supplies power to the antenna 151 to emit radio waves from the antenna 151. The receiving unit 153 receives radio waves transmitted from wireless tags TG via the antenna 151. Under the control of the control unit 100, the reading unit 15 emits a radio wave for reading a wireless tag TG, receives a radio wave emitted from the wireless tag TG that has received the radio wave, and thereby reads tag data stored in the wireless tag TG.

The communication unit 16 is an example of a communication interface conforming to a wireless communication standard, such as Bluetooth (registered trademark) or a wireless LAN. The communication unit 16 performs wireless communication with an external device, such as a mobile terminal or a server device, under the control of the control unit 100.

The display unit 17 and the operating unit 18 are connected to the control unit 100 via a bus or the like. The display unit 17 is an example of a display device, such as a liquid crystal panel, and displays various kinds of information for the operator. The operating unit 18 is an example of an input device implemented by, for example, operation buttons and/or a touch panel, and receives an operation performed by the operator.

Figure 3:
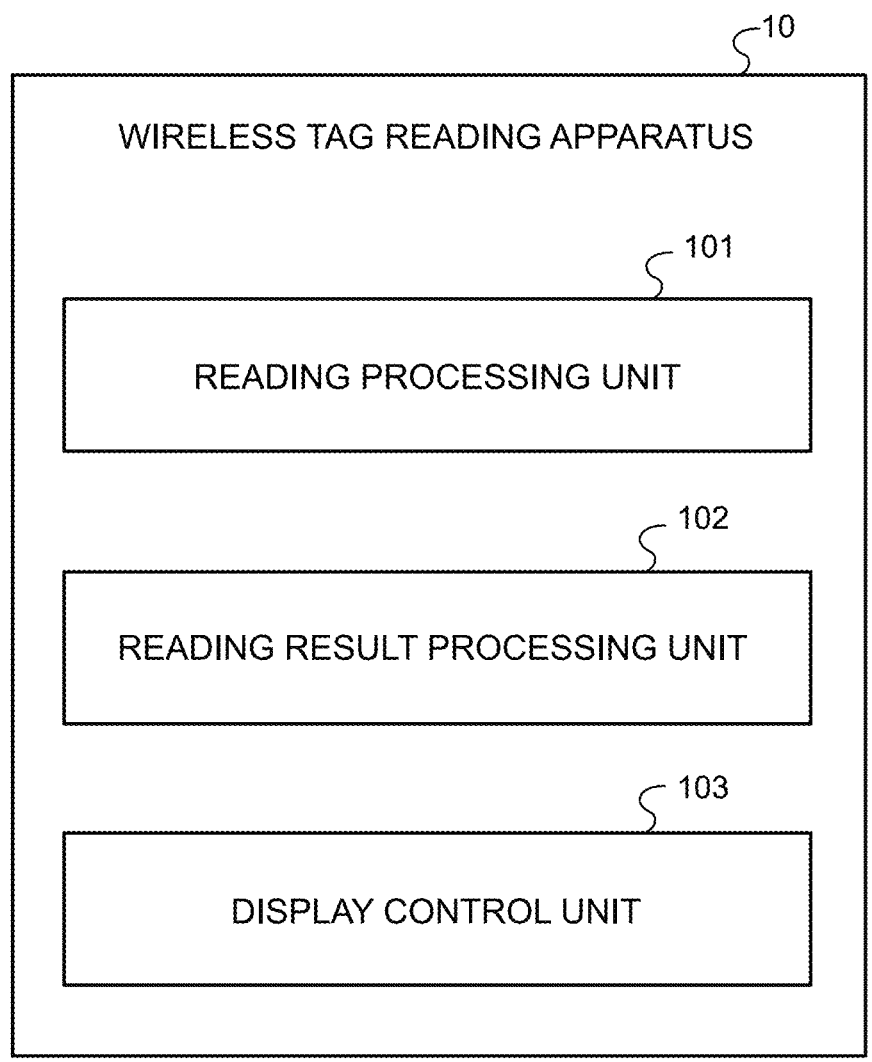
FIG. 3 is a diagram illustrating a functional configuration of the wireless tag reading apparatus according to the embodiment.

FIG. 3 is a diagram illustrating an example of a functional configuration of the wireless tag reading apparatus 10 according to the embodiment. As illustrated in FIG. 3, the wireless tag reading apparatus 10 includes a reading processing unit 101, a reading result processing unit 102, and a display control unit 103 as functional components.

Some or all of the functional components of the wireless tag reading apparatus 10 may be software components implemented by a processor (for example, the CPU 11) of the wireless tag reading apparatus 10 in cooperation with a program stored in a memory (for example, the ROM 12 or the storage unit 14). Also, some or all of the functional components of the wireless tag reading apparatus 10 may be hardware components implemented by dedicated circuits or the like provided in the wireless tag reading apparatus 10.

The reading processing unit 101 is an example of a reading unit. The reading processing unit 101 reads tag data from the wireless tag TG in cooperation with the reading unit 15. Specifically, the reading processing unit 101 (or the processor) controls the reading unit 15 (or the reading device) to cause the antenna 151 to emit a radio wave for reading the wireless tag TG. Also, the reading processing unit 101 extracts tag data by decoding a radio wave (or a response wave) received from the wireless tag TG by the antenna 151. In other words, the control unit 100 (or the processor) is configured to control the reading unit 15 (or the reading device) to read tag data from the wireless tag TG based on a response wave transmitted from the wireless tag TG.

Specifically, the reading processing unit 101 determines whether there is an error in the tag data by performing CRC checking based on the CRC 16 included in the tag data. When an error is detected by the CRC checking, the reading processing unit 101 determines that the tag data cannot be read normally, that is, cannot be decoded. Also, the reading processing unit 101 may include an anti-collision function according to, for example, a time slot method (that is, slotted ALOHA). In this case, the reading processing unit 101 also determines that the tag data cannot be read normally when a collision, in which multiple tags respond at the same time, occurs. When an error is not detected by the CRC checking, the reading processing unit 101 determines that the tag data can be read normally.

Furthermore, the reading processing unit 101 has two operation modes for reading the wireless tag TG. In other words, the control unit 100 (or the processor) is configured to switch between a first operation mode and a second operation mode.

In the first operation mode, sets of tag data are read in a single process from multiple wireless tags TG in the communication area of the antenna 151 (or the reading unit 15). Specifically, the reading processing unit 101 sequentially reads tag data from the multiple wireless tags TG in the communication area of the antenna 151 by using a known technique, such as a time slot method (that is, slotted ALOHA). Hereinafter, the first operation mode in which multiple wireless tags TG are read in a single process is also referred to as an "inventory mode".

In the second operation mode, only a specified wireless tag TG (tag data) corresponding to a specified item code or serial code is searched for and read. Specifically, the reading processing unit 101 has a filtering function for narrowing down (or masking) wireless tags to identify a wireless tag storing a specified code and reading the identified wireless tag. When an item code or a serial code of an item to be read is specified as a search condition, a wireless tag TG corresponding to the search condition is identified and read. Hereinafter, the second operation mode in which a wireless tag TG corresponding to a specified code is identified and read is also referred to as a "search mode".

The reading result processing unit 102 is an example of an output unit. The reading result processing unit 102 performs a predetermined process based on tag data read by the reading processing unit 101. Specifically, the reading result processing unit 102 registers the tag data read by the reading processing unit 101 in the read buffer BF. Here, each time new tag data is read by the reading processing unit 101, the reading result processing unit 102 compares a tag identifier included in the read tag data with the tag identifiers of tag data registered in the read buffer BF. The reading result processing unit 102 performs duplication checking in which the read tag data is discarded when the tag identifier in the read tag data matches any one of the tag identifiers of the tag data registered in the read buffer BF. This makes it possible to prevent multiple sets of tag data including the same tag identifier from being redundantly registered in the read buffer BF.

Also, the reading result processing unit 102 performs notification every time tag data read by the reading processing unit 101 is registered in the read buffer BF. For example, the reading result processing unit 102 cooperates with the display control unit 104 to display, on the display unit 17, an image or a message indicating that the tag data has been read or to display, on the display unit 17, an item code or a serial code included in the tag data.

Also, the reading result processing unit 102 may perform notification by causing a sound output device (not shown), such as a speaker included in the wireless tag reading apparatus 10, to output a sound such as a beep sound. This enables the operator of the wireless tag reading apparatus 10 to recognize the reading status of wireless tags TG at the present position based on, for example, the frequency or the number of times of notification.

Also, the reading result processing unit 102 may output (or transmit) the tag data registered in the read buffer BF to an external device via the communication unit 16. Here, it is assumed that, in the transmission process, the reading result processing unit 102 distinguishes between tag data that has already been transmitted and tag data that has not been transmitted to prevent duplicate transmission of the same tag data.

Also, in the above-described search mode, when tag data is read from a target wireless tag TG (i.e., a wireless tag TG being searched for or a specified wireless tag TG corresponding to a specified code or identifier) by the reading processing unit 101, the reading result processing unit 102 notifies the presence of the target wireless tag TG by outputting the tag data itself or data (for example, information indicating whether the target wireless tag TG is present) based on the tag data. This notification may be made by displaying information or outputting a sound as described above. Alternatively, the reading result processing unit 102 may notify the presence of the wireless tag TG by outputting the tag data read from the target wireless tag TG or the data based on the tag data to an external device via the communication unit 16.

Furthermore, the reading result processing unit 102 may cooperate with the display control unit 103 to output information indicating the position of a target wireless tag TG. The reading result processing unit 102 estimates the position of the wireless tag TG based on a radio wave (or a response wave) carrying the tag data. Specifically, the reading result processing unit 102 estimates the distance between the wireless tag TG and the wireless tag reading apparatus 10 (more specifically, the antenna 151) based on the radio wave intensity of the response wave carrying the tag data. Also, the reading result processing unit 102 estimates the direction in which the wireless tag TG is present based on the direction from which the response wave carrying the tag data is received and the orientation of the antenna 151 at the time of the reception of the tag data. Then, the reading result processing unit 102 cooperates with the display control unit 104 to display the estimated position (that is, the distance and the direction) of the target wireless tag TG on the display unit 17 and thereby notifies the operator of the existence of the target wireless tag TG.

The display control unit 103 causes the display unit 17 to display various screens. For example, the display control unit 103 causes the display unit 17 to display a screen including sets of tag data read in the inventory mode in cooperation with the reading processing unit 101 and the reading result processing unit 102. Also, the display control unit 104 causes the display unit 17 to display a screen indicating the position of a target wireless tag TG identified in the search mode in cooperation with the reading processing unit 101 and the reading result processing unit 102. In other words, the control unit 100 (or the processor) is configured to control the display unit 17 (or the display device) to display an inventory screen (or a first screen) and a search screen (or a second screen) described later.

Figure 4:
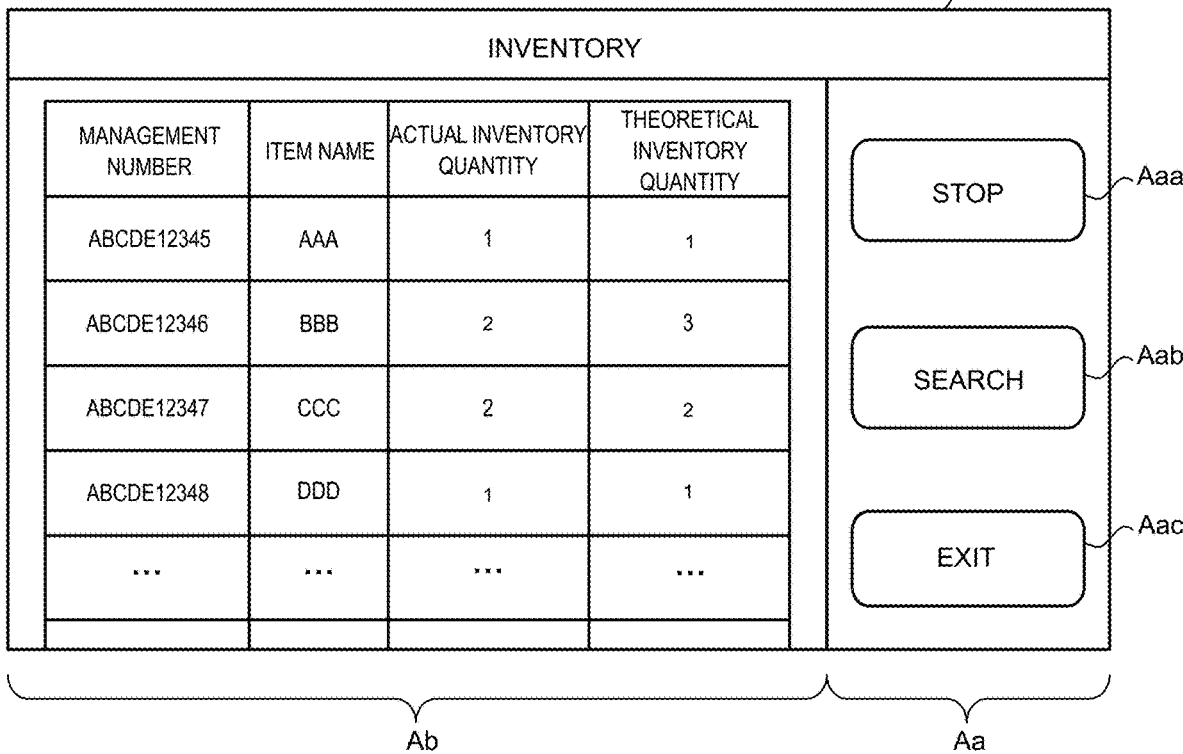
FIG. 4 is a diagram illustrating a screen displayed on a display unit of the wireless tag reading apparatus.

FIG. 4 is a diagram illustrating an example of a screen displayed on the display unit 17 of the wireless tag reading apparatus 10. FIG. 4 illustrates an example of a screen displayed in the inventory mode (hereinafter, also referred to as an inventory screen).

As illustrated in FIG. 4, an inventory screen A includes a first area Aa and a second area Ab. In the first area Aa, an operation button Aaa, a search button Aab, and an exit button Aac are displayed.

The operation button Aaa is a user interface component for instructing to start or stop the reading of the wireless tags TG. The operation button Aaa is, for example, a toggle button whose label switches between "start" and "stop" each time an operation is received. The reading processing unit 101 starts or stops reading the wireless tags TG in response to the operation of the operation button Aaa.

FIG. 4 illustrates a state in which the inventory process is being performed. In FIG. 4, the label of the operation button Aaa is "stop" indicating that the operation button Aaa functions to stop the reading of the wireless tags TG. When the operation button Aaa with the label "stop" is operated, the reading processing unit 101 stops reading the wireless tags TG. Also, in FIG. 4, when the operation button Aaa is operated, the label of the operation button Aaa is switched to "start" indicating that the operation button Aaa functions to start the reading of the wireless tags TG.

The search button Aab is a user interface component for instructing the transition to the search mode. An operation performed when the search button Aab is operated will be described later.

The exit button Aac is a user interface component for instructing to end the inventory process. When the exit button Aac is operated, the display control unit 302 stops displaying the inventory screen A. When the exit button Aac is operated, the reading processing unit 101 ends the reading of the wireless tags TG.

The second area Ab displays reading results in the inventory mode. For example, the second area Ab can be scrolled up and down, and a hidden part of the reading results can be displayed by the scroll operation.

Also, as shown in FIG. 4, the second area Ab displays a theoretical inventory quantity and an actual inventory quantity in association with each combination of a management number and an item name. Here, the theoretical inventory quantity corresponds to the inventory quantity registered in the item management table. The actual inventory quantity represents the number of sets of read tag data having the same item code and is information indicating whether the item is in stock (or present) and the actual quantity of the item in stock.

Specifically, the reading result processing unit 102 totals the number of units of read tag data having the same item code based on the tag data read by the reading processing unit 101 and the item management table. Then, the display control unit 103 cooperates with the reading result processing unit 102 to associate a management number, an item name, an actual inventory quantity, and a theoretical inventory quantity for each item code in the sets of tag data read by the reading processing unit 101 and displays an inventory list in the second area Ab. Note that the actual inventory quantity is "0" before the start of the inventory process.

For example, when all units of an item corresponding to a management number are in stock, the actual inventory quantity matches the theoretical inventory quantity. Also, for example, when some units of the item are not in stock, the actual inventory quantity is smaller than the theoretical inventory quantity. As described above, the operator can easily determine whether an item is in stock and the number of units of the item by referring to the inventory list displayed in the second area Ab.

Figure 5:
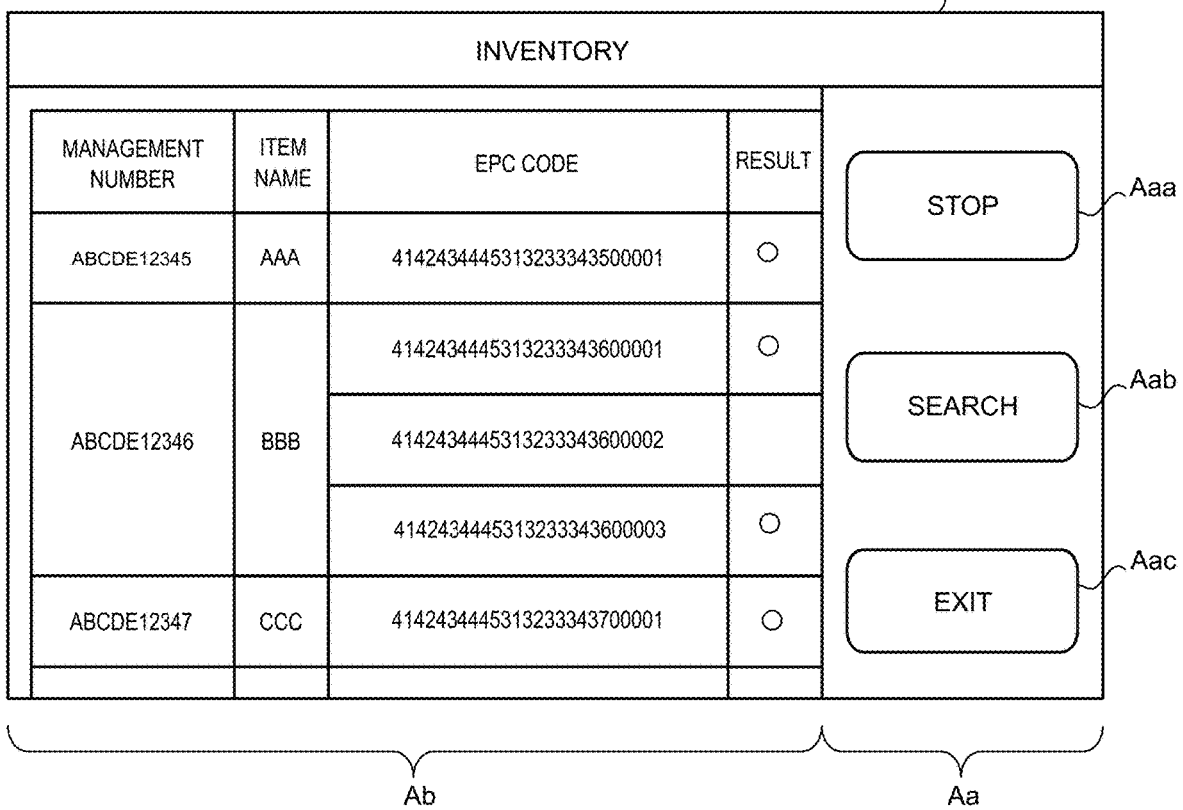
FIG. 5 is a diagram illustrating a screen displayed on the display unit of the wireless tag reading apparatus.

FIG. 5 is a diagram showing another example of an inventory screen displayed in the inventory mode on the display unit 17 of the wireless tag reading apparatus 10. In an inventory screen A of FIG. 5, the results of the inventory process are displayed in the second area Ab for respective units of each item.

As illustrated in FIG. 5, in the second area Ab, the management number and the item name of each item are associated with one or more EPC codes and one or more reading results. Here, the EPC codes displayed in the second area Ab are read from the individual item management table in which EPC codes are stored in association with the management number and the item name. Here, management numbers, item names, and EPC codes displayed in the inventory screen are examples of identifiers (or a list of identifiers).

Each reading result indicates whether the tag data of the corresponding EPC code has been read, that is, whether the wireless tag TG is present. Specifically, the reading result processing unit 102 compares EPC codes included in sets of tag data read by the reading processing unit 101 with EPC codes registered in the individual item management table to determine EPC codes that have been read. The display control unit 103 cooperates with the reading result processing unit 102 to display the determination results (or reading results) of EPC codes in association with the corresponding EPC codes. According to the reading results shown in FIG. 5, the theoretical inventory quantity of the item with the management number "ABCDE 12346" is "3", but one unit of the item is not in stock.

Thus, the operator can determine whether each of multiple units of an item, which have the same management number and different EPC codes, is in stock by referring to the inventory list displayed in the second area Ab.

In the inventory screen A of each of FIGS. 4 and 5, the search button Aab is provided in the first area Aa. For example, the operator can select a desired item from among the items displayed in the second area Ab of the inventory screen A of FIG. 4 and then operate the search button Aab (or vice versa) to set the selected item as a search target. In this case, the reading processing unit 101 transitions to the search mode and starts reading one or more wireless tags TG with the item code of the selected item.

Furthermore, for example, the operator can select a desired EPC code from among the EPC codes displayed in the second area Ab of the inventory screen A of FIG. 5 to set a single unit of an item corresponding to the selected EPC code as a search target and then operate the search button Aab (or vice versa). In this case, the reading processing unit 101 transitions to the search mode and starts reading a wireless tag TG with the selected EPC code. The inventory screen A of each of FIGS. 4 and 5 is an example of a first screen including a list of identifiers.

It is preferable to be able to switch between the inventory screen A of FIG. 4 and the inventory screen A of FIG. 5 in accordance with an operation of the operator. For example, when a detailed display button or the like is provided in the first area Aa of the inventory screen A of FIG. 4 and the detailed display button is operated, the inventory screen A of FIG. 5 may be displayed. Also, in the inventory screen A of FIG. 4, when a desired item is selected from among the items displayed in the second area Ab by, for example, a long press, a part of the inventory screen A of FIG. 5 related to the selected item may be displayed.

Figure 6:
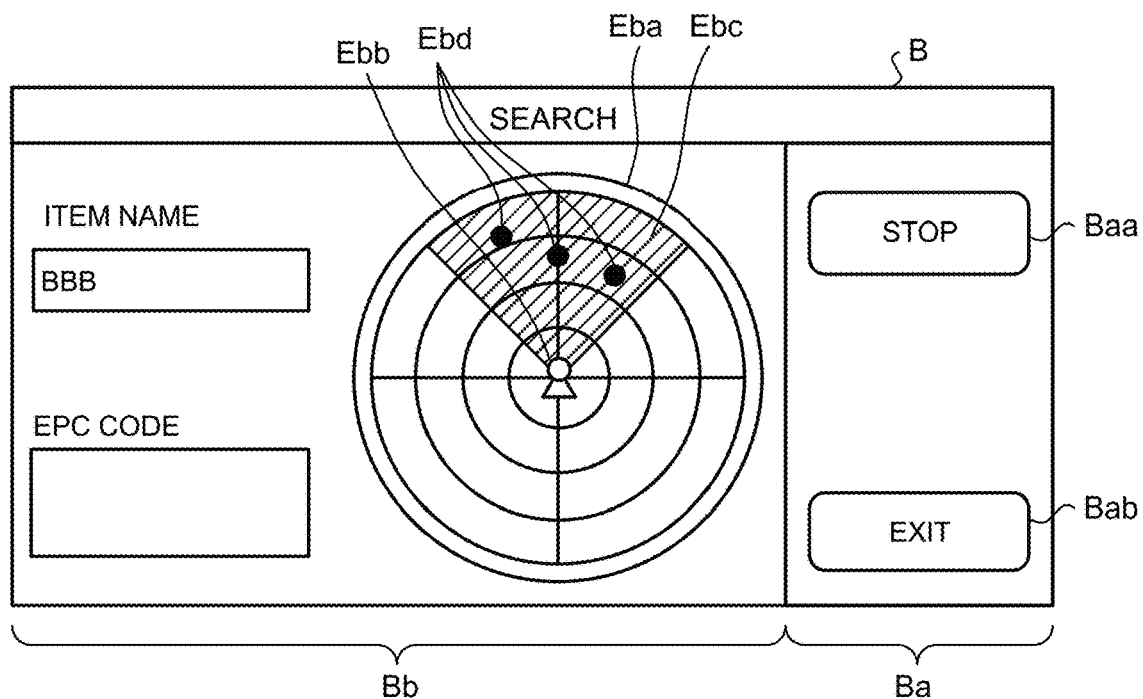
FIG. 6 is a diagram illustrating a screen displayed on the display unit of the wireless tag reading apparatus.

FIG. 6 is a diagram illustrating an example of a screen displayed on the display unit 17 of the wireless tag reading apparatus 10. FIG. 6 illustrates an example of a screen displayed in the search mode (hereinafter, also referred to as a search screen).

As illustrated in FIG. 6, a search screen B includes a first area Ba and a second area Bb. In the first area Ba, an operation button Baa and an exit button Bab are displayed.

The operation button Baa is a user interface component for instructing to start or stop the search process. The operation button Baa is, for example, a toggle button whose label switches between "start" and "stop" each time an operation is received.

FIG. 6 illustrates a state in which the search process is being performed. In FIG. 6, the label of the operation button Baa is "stop" indicating that the operation button Baa functions to stop the search process. When the operation button Baa with the label "stop" is operated, the reading processing unit 101 stops the reading of the wireless tags TG. Also, in FIG. 6, when the operation button Baa is operated, the label of the operation button Baa is switched to "start" indicating that the operation button Baa functions to start the reading of the wireless tags TG.

The exit button Bab is a user interface component for instructing to end the search mode. When the exit button Bab is operated, the display control unit 103 ends the display of the search screen B and displays, for example, the inventory screen A of FIG. 4. When the exit button Bab is operated, for example, the reading processing unit 101 ends the reading and starts the reading in the inventory mode.

In the second area Bb, tag data to be searched (i.e., target tag data) and an item name corresponding to the tag data are displayed. Also, in the second area Bb, a radar screen Eba indicating the position of the wireless tag TG corresponding to the target tag data is displayed. The search screen B is an example of a second screen including a radar screen.

In the radar screen Eba, a center Ebb represents the position of the wireless tag reading apparatus 10, and the direction and the distance are represented by concentric circles. Also, in the radar screen Eba, a fan-shaped area Ebc indicates the radiation area of a radio wave emitted by the wireless tag reading apparatus 10.

When a target wireless tag TG (or a specified wireless tag TG) enters the radiation area and the reading processing unit 101 acquires the tag data of the target wireless tag TG, the reading result processing unit 102 estimates the distance and the direction of the target wireless tag TG. The display control unit 104 displays a pointer Ebd representing the target wireless tag TG at the estimated position on the radar screen Eba. In FIG. 6, multiple pointers Ebd are displayed. The pointers Ebd are examples of a first image and a second image.

With the above configuration, the operator can easily find the position of the target wireless tag TG, that is, the position of the corresponding item, by moving such that the center Ebb of the radar screen Eba moves closer to the position of the pointer Ebd.

In the present embodiment, it is assumed that the operator reads the wireless tags TG while moving with the wireless tag reading apparatus 10 in hand. For example, the operator can read tag data from wireless tags TG located in a surrounding area in the inventory mode and then find the positions of wireless tags TG of multiple units of an item or the position of a wireless tag TG of a single unit of the item by selecting a code (an item name (an item code) or an EPC code) from the read tag data.

Here, although the wireless tag reading apparatus 10 reads tag data by decoding a response wave from the wireless tag TG, there are cases where the tag data cannot be read normally due to various factors.

For example, as the distance between the wireless tag reading apparatus 10 and the wireless tag TG increases, the response wave from the wireless tag TG becomes weaker. For this reason, there is a case where the wireless tag reading apparatus 10 cannot normally read the tag data even when the response wave from the wireless tag TG is received. Also, for example, in a logistics warehouse where a large number of items (or wireless tags) are stored, since metal shelves provided in the logistics warehouse interfere with radio waves, it may occur that tag data can be read at a certain position but cannot be normally read at a slightly different position even when a response wave can be received. In recent years, there is a wireless tag that can operate with a smaller power and can respond even at a distant position. However, since the response wave becomes weaker as the distance increases, the tag data cannot be read normally even when the response wave can be received. Therefore, the practical reading distance is limited.

As described above, with the wireless tag reading apparatus 10, there is a case where tag data cannot be read normally even when a response wave from the wireless tag TG can be received. When this occurs, for example, while finding the position of a wireless tag TG, the found position of the wireless tag TG may be lost, and the efficiency of the search process may be reduced.

Therefore, in the wireless tag reading apparatus 10 of the present embodiment, when reading is performed by selecting a target wireless tag TG in, for example, the search mode, it is determined that the target wireless tag TG is present and data indicating the presence of the target wireless tag TG is output even if the tag data cannot be read normally.

Specifically, while the reading processing unit 101 is operating in the search mode, even if the reading processing unit 101 determines that the tag data cannot be normally read, the reading result processing unit 102 of the present embodiment determines that the target wireless tag TG (or the tag data) is present and outputs data indicating that the target wireless tag TG is present.

For example, when an item name (or an item code) is specified as a search target and a CRC error is detected in a response wave from a wireless tag TG, the reading result processing unit 102 determines that the wireless tag TG storing the item code is present in the communication area of the antenna 151. Also, for example, when an EPC code (or a serial code) is specified as a search target and a CRC error is detected in a response wave from the corresponding wireless tag TG, the reading result processing unit 102 determines that the wireless tag TG storing the serial code is present in the communication area of the antenna 151. Then, the reading result processing unit 102 notifies the presence of the responding wireless tag TG using the displaying unit 17 or the like.

For example, the reading result processing unit 102 cooperates with the display control unit 104 to cause the display unit 17 to display an image or a message indicating the presence of the wireless tag TG corresponding to the search condition. Also, for example, the reading result processing unit 102 may estimate the position of the wireless tag TG corresponding to the search condition based on the response wave with which the reading error of the tag data has occurred, and display the estimated position on the search screen B (see FIG. 6) to notify the presence and the position of the wireless tag TG.

Thus, with the wireless tag reading apparatus 10, even when, for example, a reading error of tag data occurs during a search operation for searching a wireless tag TG, the search operation can be continued without losing the result of determining the presence or the position of the wireless tag TG.

The reading result processing unit 102 may display, on the search screen B, the position of a wireless tag TG for which a reading error has occurred such that the position of the wireless tag TG is distinguishable from the position of a wireless tag TG whose tag data has been normally read. For example, as illustrated in FIG. 7, the reading result processing unit 102 may change the color or size of the pointer Ebd indicating the position of a wireless tag TG whose tag data has not been normally read from the color or size of the pointer Ebd indicating the position of a wireless tag TG whose tag data has been normally read.

Figure 7:
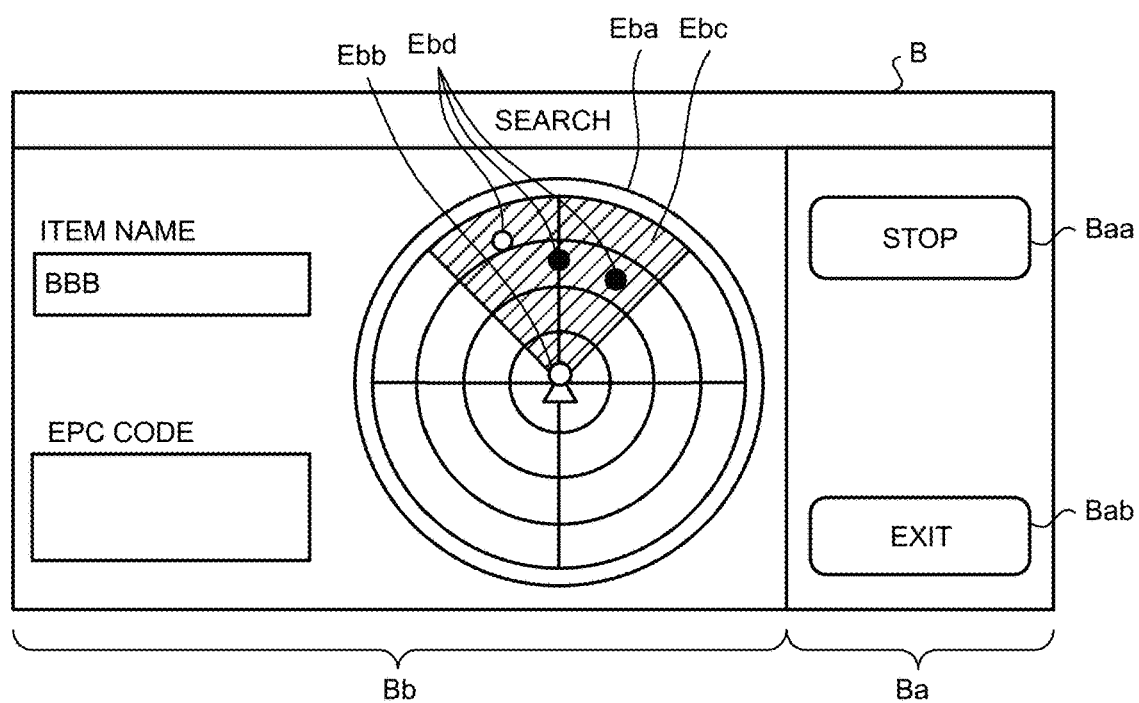
FIG. 7 is a diagram illustrating a screen displayed on the display unit of the wireless tag reading apparatus.

Here, FIG. 7 is a diagram showing an example of a screen displayed on the display unit 17 of the wireless tag reading apparatus 10. Similarly to FIG. 6, FIG. 7 shows an example of a search screen displayed in the search mode.

In FIG. 7, a pointer Ebd represented by a black dot indicates the position of a wireless tag TG whose tag data has been normally read, and a pointer Ebd represented by a white dot indicates the position of a wireless tag TG whose tag data has not been normally read. As described above, by distinguishably displaying the positions of wireless tags TG in accordance with the reading status of the wireless tags TG, it is possible to enable the operator to identify a wireless tag TG having poor communication status and thereby prompt the operator to change, for example, the search location. The pointer Ebd indicated by a white dot is an example of a first image. The pointer Ebd indicated by a black dot is an example of a second image.

As described above, even when tag data cannot be read normally, the reading result processing unit 102 according to the present embodiment can effectively use the fact that a response wave has been received as a proof of the presence and therefore can notify the operator of the presence or the position of a wireless tag as in a case in which the tag data has been read normally.

In the above example, the reading result processing unit 102 notifies, via the display unit 17, information indicating the presence of a wireless tag TG for which a reading error has occurred. Alternatively, the reading result processing unit 102 may output information indicating the presence of a wireless tag TG for which a reading error has occurred to an external device via the communication unit 16. In this case, the reading result processing unit 102 may output the information indicating the presence of the wireless tag TG together with the corresponding code specified as the search target.

Also, the reading result processing unit 102 may be configured to explicitly notify (or output) information even when tag data has not been read. Here, the case in which tag data has not been read is, for example, a case in which the response wave has not been received or a case in which duplicate tag data has been read.

Figure 8:
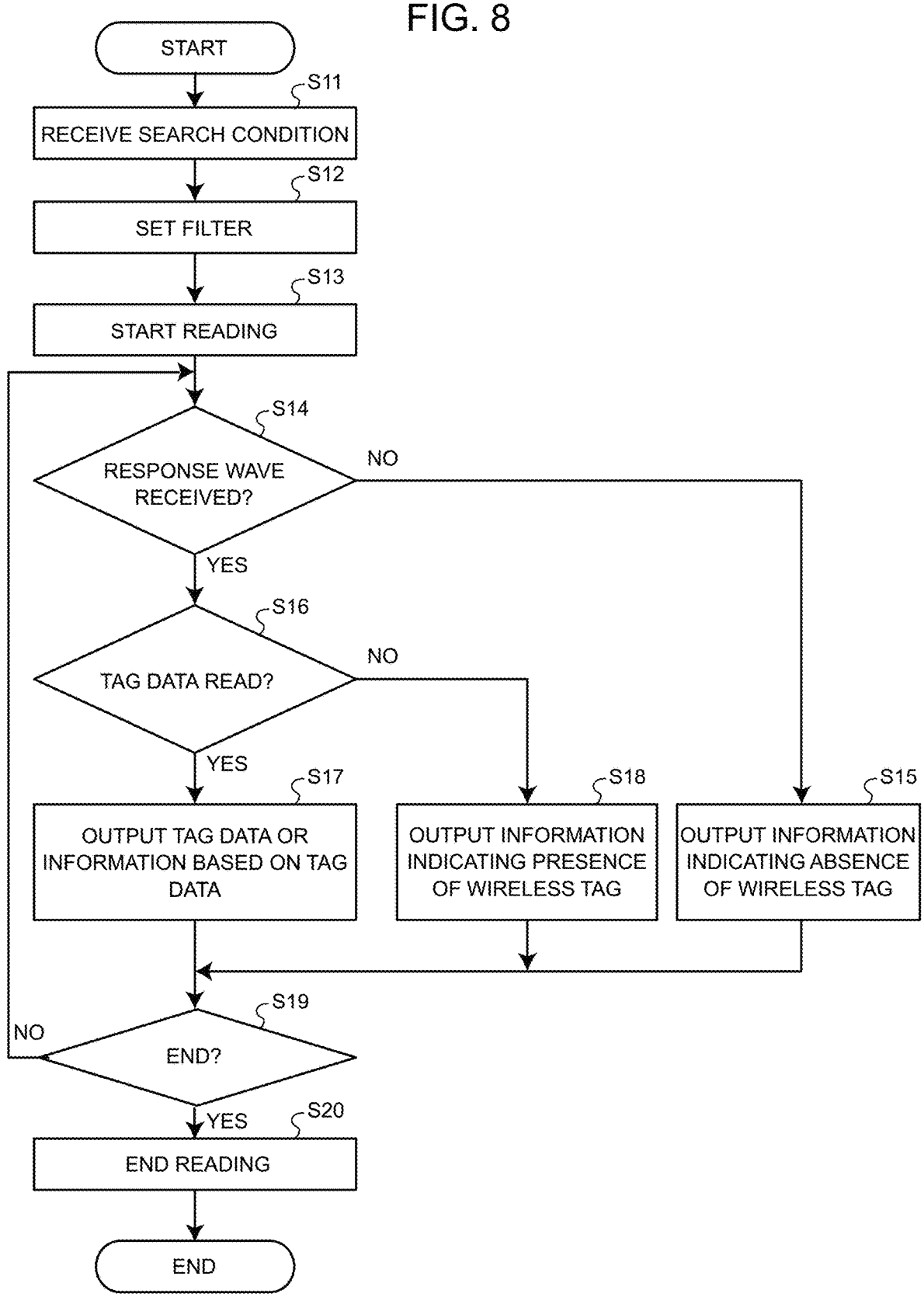
FIG. 8 is a flowchart illustrating a search process performed by the wireless tag reading apparatus according to the embodiment.

Next, an example of a process performed by the wireless tag reading apparatus 10 will be described with reference to FIG. 8. FIG. 8 is a flowchart illustrating an example of a search process performed by the wireless tag reading apparatus 10. Each step in FIG. 8 is performed by the control unit 100 (or the processor) by controlling a component of the wireless tag reading apparatus or an external device.

In FIG. 8, it is assumed that the wireless tag reading apparatus 10 has completed reading tag data in the inventory mode from wireless tags TG that are present in the vicinity of the wireless tag reading apparatus 10. Also, it is assumed that the search screen B is displayed on the display unit 17.

First, the reading processing unit 101 receives a condition (or a search condition) for searching a wireless tag TG via the operating unit 18 or the like (step S11). The search condition is an item code, an EPC code (or a serial code), or the like. In this example, it is assumed that the search condition is an EPC code. Next, the reading processing unit 101 sets the received search condition as a filter (step S12) and starts reading a target wireless tag TG (or a specified wireless tag TG) in the search mode (step S13).

Next, the reading processing unit 101 determines whether a response wave has been received from the target wireless tag TG (step S14). When a response wave has not been received (step S14: No), the process proceeds to step S15. Then, the reading result processing unit 102 outputs information indicating the absence of the target wireless tag TG (step S15), and the process proceeds to step S19. Note that step S15 may be omitted.

When a response wave has been received at step S14 (step S14: Yes), the reading processing unit 101 determines whether tag data has been read normally (step S16). When the tag data has been read normally (step S16: Yes), the reading result processing unit 102 outputs the tag data or information based on the tag data (step S17), and proceeds to step S19. For example, the reading result processing unit 102 estimates the position of the target wireless tag TG on the basis of the response wave from which the tag data has been read normally and outputs the estimated position on the search screen B.

When the tag data has not been read normally (step S16: No), the reading result processing unit 102 outputs information indicating the presence of the target wireless tag TG (step S18) and proceeds to step S19. For example, the reading result processing unit 102 estimates the position of the target wireless tag TG on the basis of the response wave with which a reading error has occurred and outputs the estimated position on the search screen B.

Next, the reading processing unit 101 determines whether an instruction to end the search mode has been received (step S19). When the instruction to end the search mode has not been received (step S19: No), the reading processing unit 101 continues the reading operation by returning to step S14. When the instruction to end the search mode has been received (step S19: Yes), the reading processing unit 101 ends the reading operation (step S20) and ends the search process.

As described above, the wireless tag reading apparatus 10 operates in the search mode in which a target wireless tag TG is specified, and tag data is read from a response wave transmitted from the target wireless tag TG. Also, when the tag data can be read normally, the wireless tag reading apparatus 10 outputs the read tag data or information based on the tag data; and when the tag data cannot be read normally, the wireless tag reading apparatus 10 outputs information indicating the presence of the target wireless tag TG.

Thus, with the wireless tag reading apparatus 10, even when the tag data cannot be read normally from a target wireless tag, as long as a response wave can be received from the target wireless tag, the presence of the target wireless tag can be notified to the operator or another user. Therefore, the wireless tag reading apparatus 10 can improve the convenience in reading wireless tags.

The above-described embodiment can be modified as appropriate by changing some of the configurations or functions of the above-described apparatuses. Below, some variations of the above-described embodiment will be described as other embodiments. In the descriptions below, differences from the above-described embodiment will be mainly discussed, and detailed descriptions of the same components and features as those described above will be omitted. Furthermore, the variations described below may be implemented individually or in any appropriate combination.

First Variation

In the above-described embodiment, the wireless tag reading apparatus 10 includes the display unit 17 and the operating unit 18. However, the display unit 17 and the operating unit 18 may be provided in an external device connected to the wireless tag reading apparatus 10 via the communication unit 16. In this case, the external device may include the display control unit 103 that cooperates with the reading result processing unit 102 of the wireless tag reading apparatus 10 to display, for example, the inventory screen A and the search screen B on the external device.

Second Variation

In the above-described embodiment, the reading result processing unit 102 outputs information indicating the presence of a target wireless tag TG based on the reception of a response wave even when tag data cannot be read normally. This function (hereinafter, also referred to as a presence notification function) may be enabled and disabled in accordance with an operation performed by the operator using the operating unit 18. In this case, the control unit 100 functions as an example of a setting unit in cooperation with the operating unit 18 and stores a setting specified by the operator as setting information in the storage unit 14 or the like.

When the presence notification function is enabled, the reading result processing unit 102 outputs information indicating the presence of a target wireless tag TG based on the reception of a response wave even if tag data cannot be read normally. Also, when the presence notification function is disabled and tag data cannot be read normally, the reading result processing unit 102 may explicitly output information indicating the absence of the target wireless tag TG or may prevent the output of information indicating whether the target wireless tag TG is present.

Accordingly, the convenience in reading wireless tags TG can be improved by enabling or disabling the presence notification function. For example, when it is desired to confirm the presence of wireless tags TG in a stable communication state, it is possible to display only wireless tags TG in a stable communication state on, for example, the search screen B by disabling the presence notification function. Thus, the presence notification function can be enabled or disabled according to the purpose.

Programs executed by the wireless tag reading apparatus 10 of the above-described embodiment may be provided in a ROM or the like in advance. Programs executed by the wireless tag reading device 10 of the above-described embodiment may be provided in a computer-readable recording medium, such as a CD-ROM, a flexible disk (FD), a CD-R, or a Digital Versatile Disk (DVD), in an installable format or an executable format.

Also, programs executed by the wireless tag reading apparatus 10 of the above-described embodiment may be stored in a computer connected to a network, such as the Internet, and may be downloaded via the network. Furthermore, programs executed by the wireless tag reading apparatus 10 of the above-described embodiment may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading apparatus comprising:
    a reading device; and
    a processor configured to:
        control the reading device to attempt to read tag data from a wireless tag based on a response wave transmitted from the wireless tag,
        determine whether the tag data has been read normally,
        upon determining that the tag data has been read normally, output either the tag data or first information based on the tag data, and
        upon determining that the tag data has not been read normally,
            determine an estimated position of the wireless tag based on the response wave, and
            output second information indicating presence of the wireless tag, the second information including the estimated position of the wireless tag.

2. The wireless tag reading apparatus according to claim 1, further comprising:
    a display device, wherein
    the processor is configured to, when the tag data has not been read normally, control the display device to display a first image representing the estimated position of the wireless tag.

3. The wireless tag reading apparatus according to claim 2, wherein
    the processor is configured to, when the tag data has been read normally:
        determine an estimated position of the wireless tag based on the response wave, and
        control the display device to display a second image representing the estimated position of the wireless tag.

4. The wireless tag reading apparatus according to claim 3, wherein
    each of the first and second images is displayed in a different color or size.

5. The wireless tag reading apparatus according to claim 1, wherein
    the processor is configured to
        enable or disable a function to output the second information when tag data is not read normally, and
        output third information indicating absence of the wireless tag when the function is disabled and the tag data has not been read normally.

6. The wireless tag reading apparatus according to claim 1, wherein
    the processor is configured to switch between a first operation mode in which sets of tag data are read from all of wireless tags within a communication area of the reading device and a second operation mode in which tag data that satisfies a predetermined condition is read from one of the wireless tags.

7. The wireless tag reading apparatus according to claim 6, further comprising:
    a display device, wherein
    in the first operation mode, the processor controls the display device to display a first screen including a list of identifiers included in the sets of tag data read from the wireless tags.

8. The wireless tag reading apparatus according to claim 7, wherein
    the processor is configured to switch to the second operation mode when an identifier is selected from the list of identifiers through the first screen and control the reading device to read tag data from a wireless tag corresponding to the selected identifier.

9. The wireless tag reading apparatus according to claim 8, wherein
    in the second operation mode, the processor controls the display device to display a second screen including a radar screen such that a center of the radar screen indicates a position of the wireless reading apparatus and a fan-shaped area of the radar screen indicates a radiation area of a radio wave emitted from the reading device, and
    when the wireless tag corresponding to the selected identifier is within the fan-shaped area, the processor controls the display device to display an image representing a position of the wireless tag on the radar screen.

10. A method performed by a wireless tag reading apparatus, the method comprising:
attempting to read tag data from a wireless tag based on a response wave transmitted from the wireless tag;
determining whether the tag data has been read normally;
upon determining that the tag data has been read normally, outputting either the tag data or first information based on the tag data; and
upon determining that the tag data has not been read normally,
determining an estimated position of the wireless tag based on the response wave, and
outputting second information indicating presence of the wireless tag, the second information including the estimated position of the wireless tag.

11. The method according to claim 10, further comprising:
when the tag data has not been read normally, displaying a first image representing the estimated position of the wireless tag.

12. The method according to claim 11, further comprising:
when the tag data has been read normally:
determining an estimated position of the wireless tag based on the response wave, and
displaying a second image representing the estimated position of the wireless tag.

13. The method according to claim 12, wherein each of the first and second images is displayed in a different color or size.

14. The method according to claim 10, further comprising:
enabling or disabling a function to output the second information when tag data is not read normally; and
outputting third information indicating absence of the wireless tag when the function is disabled and the tag data has not been read normally.

15. The method according to claim 10, further comprising:
switching between a first operation mode in which sets of tag data are read from all of wireless tags within a communication area of the wireless tag reading apparatus and a second operation mode in which tag data that satisfies a predetermined condition is read from one of the wireless tags.

16. The method according to claim 15, further comprising:
in the first operation mode, displaying a first screen including a list of identifiers included in the sets of tag data read from the wireless tags.

17. The method according to claim 16, further comprising:
when an identifier is selected from the list of identifiers in the first screen, switching to the second operation mode, and reading tag data from a wireless tag corresponding to the selected identifier.

18. A non-transitory computer-readable storage medium storing a program for causing a processor of a wireless tag reading apparatus to execute a process including:
attempting to read tag data from a wireless tag based on a response wave transmitted from the wireless tag;
determining whether the tag data has been read normally;
upon determining that the tag data has been read normally, outputting either the tag data or first information based on the tag data; and
upon determining that the tag data has not been read normally,
determining an estimated position of the wireless tag based on the response wave, and
outputting second information indicating presence of the wireless tag, the second information including the estimated position of the wireless tag.

* * * * *